United States Patent
Kahler et al.

(10) Patent No.: US 7,788,530 B2
(45) Date of Patent: Aug. 31, 2010

(54) STORAGE SERVER CONFIGURATION DESPITE AN OUT-OF-SERVICE STORAGE ADAPTER

(75) Inventors: David Ray Kahler, Tucson, AZ (US); Kurt Allen Lovrien, Tucson, AZ (US); Jacob Lee Sheppard, Gilbert, AZ (US)

(73) Assignee: International Business Machines Corporation, Armonk, NY (US)

(*) Notice: Subject to any disclaimer, the term of this patent is extended or adjusted under 35 U.S.C. 154(b) by 469 days.

(21) Appl. No.: 11/769,620

(22) Filed: Jun. 27, 2007

(65) Prior Publication Data

US 2009/0006428 A1    Jan. 1, 2009

(51) Int. Cl.
G06F 11/00 (2006.01)
G06F 11/20 (2006.01)

(52) U.S. Cl. ............................ 714/9; 714/4; 714/43
(58) Field of Classification Search ............... 714/4, 714/9, 43
See application file for complete search history.

(56) References Cited

U.S. PATENT DOCUMENTS

| | | | |
|---|---|---|---|
| 5,845,061 A * | 12/1998 | Miyamoto et al. | 714/4 |
| 6,128,750 A * | 10/2000 | Espy et al. | 714/7 |
| 6,330,642 B1 | 12/2001 | Carteau | 711/114 |
| 6,725,295 B2 * | 4/2004 | Iwatani | 710/38 |
| 7,000,083 B2 | 2/2006 | Jarvis et al. | 711/161 |
| 2002/0166079 A1 * | 11/2002 | Ulrich et al. | 714/6 |
| 2005/0138461 A1 * | 6/2005 | Allen et al. | 714/4 |
| 2005/0273645 A1 * | 12/2005 | Satran et al. | 714/4 |
| 2006/0107004 A1 * | 5/2006 | Benhase et al. | 711/162 |
| 2006/0155718 A1 | 7/2006 | Li et al. | 707/100 |
| 2006/0242377 A1 * | 10/2006 | Kanie et al. | 711/165 |

* cited by examiner

Primary Examiner—Scott T Baderman
Assistant Examiner—Joseph Schell
(74) Attorney, Agent, or Firm—Kunzler Needham Massey & Thorpe

(57) ABSTRACT

In one version of the present invention, a system to configure a storage server despite an out-of-service storage adapter includes a storage array and a pair of storage servers connected to the storage array via a corresponding pair of storage adapters. The storage servers may be configured to retrieve configuration metadata from the storage array during a system initialization sequence and communicate the configuration metadata to the other storage server in case one of the storage servers is blocked from accessing the storage array due to an out-of-service storage adapter. The storage servers may also be configured to share a processing load despite the out-of-service storage adapter. The configuration metadata may include a variety of definitions and control parameters such as rank definitions, volume definitions, logical subsystem definitions, mirroring parameters, remote archiving parameters, a rank segment table, and page pointer data.

20 Claims, 3 Drawing Sheets

STORAGE SERVER CONFIGURATION DESPITE AN OUT-OF-SERVICE STORAGE ADAPTER

BACKGROUND OF THE INVENTION

1. Field of the Invention

This invention relates to configuring storage servers from configuration metadata and more particularly relates to configuring storage servers from configuration metadata retrieved from a storage array (for example during a system initialization sequence) despite an out-of-service storage adapter.

2. Description of the Related Art

Data storage systems are deployed in a wide variety of enterprises and applications. To satisfy various levels of redundancy and performance, storage arrays such as RAID arrays are often configurable with wide variety of options and definitions such as volume definitions, rank definitions, mirroring options, archiving options, and the like. Storage servers that interface with storage arrays are often required to know the configuration options and definitions of each storage array in order to properly communicate with that storage array.

Configuration metadata that describes storage options and definitions may be stored in a known location on a storage array such as a sector adjacent to a boot sector. During system initialization, it may be necessary for the storage server to access the configuration metadata on the storage array. In certain situations, a potentially operational storage server may be blocked from accessing the configuration metadata due to an out-of-service storage adapter.

From the foregoing discussion, Applicants assert that a need exists for a method, apparatus, and system that provide configuration metadata to a storage server during a system initialization sequence despite an out-of-service storage adapter.

SUMMARY OF THE INVENTION

The present invention has been developed in response to the present state of the art, and in particular, in response to the problems and needs in the art that have not yet been fully solved by currently available storage server configuration techniques. Accordingly, the present invention has been developed to provide a method, apparatus, and system that provide configuration metadata to a storage server during a system initialization sequence despite an out-of-service storage adapter.

In one version of the present invention, a system to configure a storage server despite an out-of-service storage adapter includes a storage array comprising multiple storage devices, and a pair of storage servers connected to the storage array via a pair of storage adapters. The storage servers may be configured to retrieve configuration metadata from the storage array during a system initialization sequence and communicate the configuration metadata to the other storage server in case one of the servers is blocked from accessing the storage array due to an out-of-service storage adapter.

The storage servers may also be configured to share a processing load in response to an out-of-service condition for one of the storage adapters. The out-of-service condition for a storage adapter may be due to a variety of conditions including a fenced condition, a quiesced condition, an unconfigured condition, a hardware failure, and a software failure. The configuration metadata may include a variety of definitions and control parameters such as rank definitions, volume definitions, logical subsystem definitions, mirroring parameters, remote archiving parameters, a rank segment table, and page pointer data.

The storage servers may include a host interface that enables communications with a host, a storage adapter interface that enables communications with the storage array, and a kernel loader that retrieves configuration metadata from the storage array via the storage adapter interface during a system initialization sequence. The storage servers may also include a partner server interface configured to communicate the configuration metadata to the other storage server in response to a request for the configuration metadata from the other storage server. The configuration metadata may be essential to storing data to, and retrieving data from, the storage array.

In one embodiment, the partner server interface enables communication with the other storage server via a mail channel and a DMA channel. The storage servers may use the partner server interface to coordinate with each other and share a processing load with each other.

The program code that controls the storage servers may include a variety of operations selected to configure the storage servers despite an out-of-service condition for one of the storage adapters. In one embodiment, the operations include retrieving configuration metadata from a storage array to a first storage server via a first storage adapter during a system initialization sequence for the first storage server, and communicating the configuration metadata to a second storage server, the second storage server connected to the storage array via a second storage adapter. The operations may also include the first storage server facilitating storage communications between the second storage server and the storage array via the first storage adapter in response to an out-of-service status for the second storage adapter.

The operations may also include detecting an out-of-service status for the second storage adapter and detecting an available-for-service status for the first storage adapter. The out-of-service status may be due to a variety conditions such as a fenced condition, a quiesced condition, an unconfigured condition, a hardware failure, and a software failure.

It should be noted that references throughout this specification to features, advantages, or similar language does not imply that all of the features and advantages that may be realized with the present invention should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
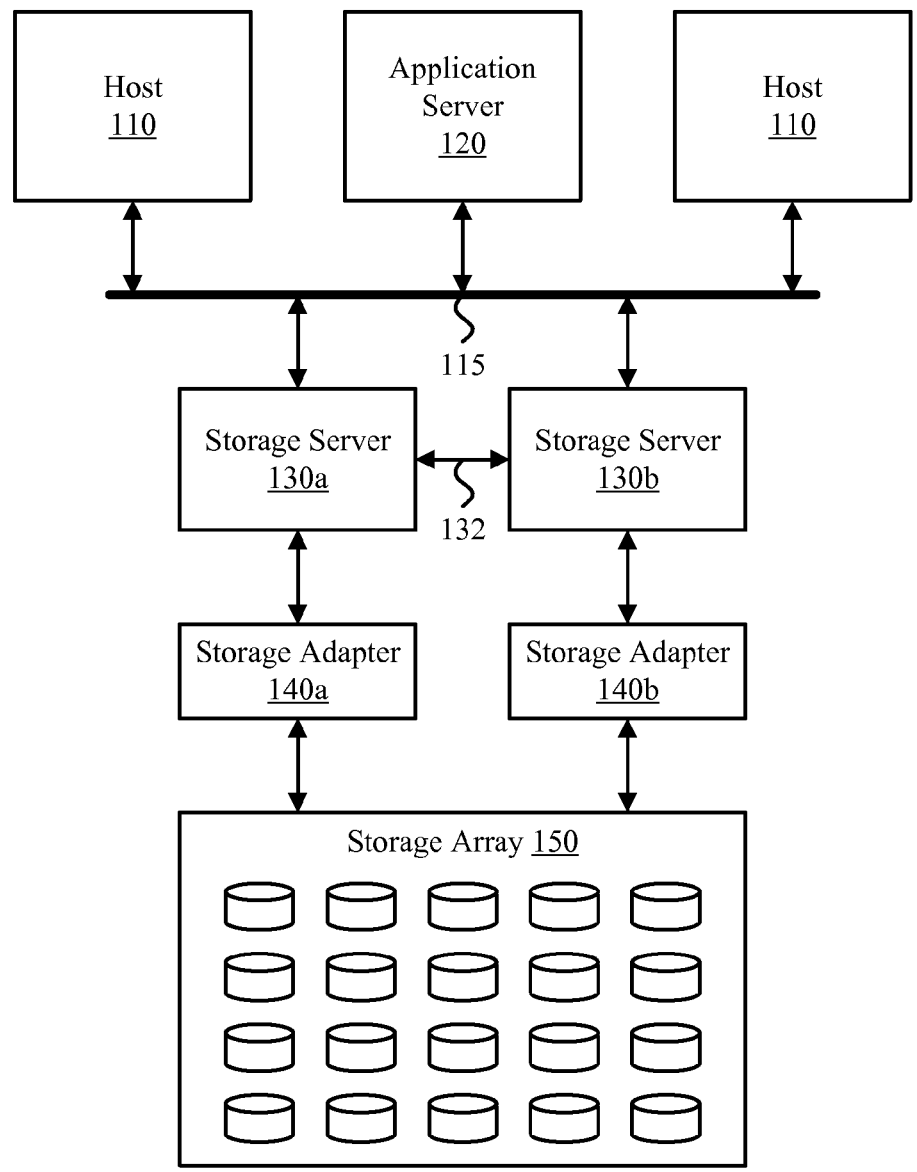
FIG. 1 is a block diagram depicting one embodiment of a data processing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It should also be noted that references to a computer program product may refer to any form capable of providing machine readable instructions including a storage device, a computing device, and a communication device.

FIG. 1 is a block diagram depicting one embodiment of a data processing system 100 in accordance with the present invention. The depicted data processing system 100 includes one or more hosts 110, an application server 120, a plurality of storage servers 130 with corresponding storage adapters 140, and a storage array 150. The data processing system 100 illustrates one environment in which the present invention may be deployed to enable proper configuration of the storage servers 130 during a system initialization sequence despite an out-of-service storage adapter 140.

The hosts 110 and other computing devices such as the application server 120 may store and retrieve data from the storage array 150 via a storage network 115 (or the like) and the storage servers 130. The hosts 110 may also request that the storage servers 130 organize the store arrays 150 into logical units suitable for access such subsystems, volumes, ranks, and the like. The hosts 110 (or the like) may also request certain mirroring, archiving, and redundancy options for the data stored on the storage arrays.

The storage servers 130 may receive the configuration requests, definitions, and options, and generate configuration metadata (not shown) that defines the functionality and operation of the storage arrays 150. The configuration metadata may be stored at known locations on the storage array 150 and accessed by the storage servers 130 during a system initialization sequence in order to facilitate proper operation once the system initialization sequence has finished. For more information on one example of how and where such configuration metadata may be stored and verified, the reader is referred to co-pending U.S. patent application Ser. No. 10/991,664 which is incorporated herein by reference.

In certain situations, one of the storage adapters 140 may be unable or unavailable to access the storage array 150 resulting in an out-of-service status for the particular storage adapter. For example, the storage adapter 140a may suffer from a hardware or software failure and be unable to provide the configuration metadata to the storage server 130a during a system initialization sequence. The present invention facilitates providing the configuration metadata to a blocked storage server (130a in this example) despite such an out-of-service storage adapter (140a). In the described example, the configuration metadata may be retrieved by the storage server 130b via the storage adapter 140b during a system initialization sequence and provided to the storage server 130a via one or more communication channels 132.

The storage servers 130 may also be configured to share a processing load in response to an out-of-service condition for one of the storage adapters 140. The out-of-service condition for a storage adapter 140 may be due to a variety of conditions including a fenced condition, a quiesced condition, an unconfigured condition, a hardware failure, and a software failure.

Figure 2:
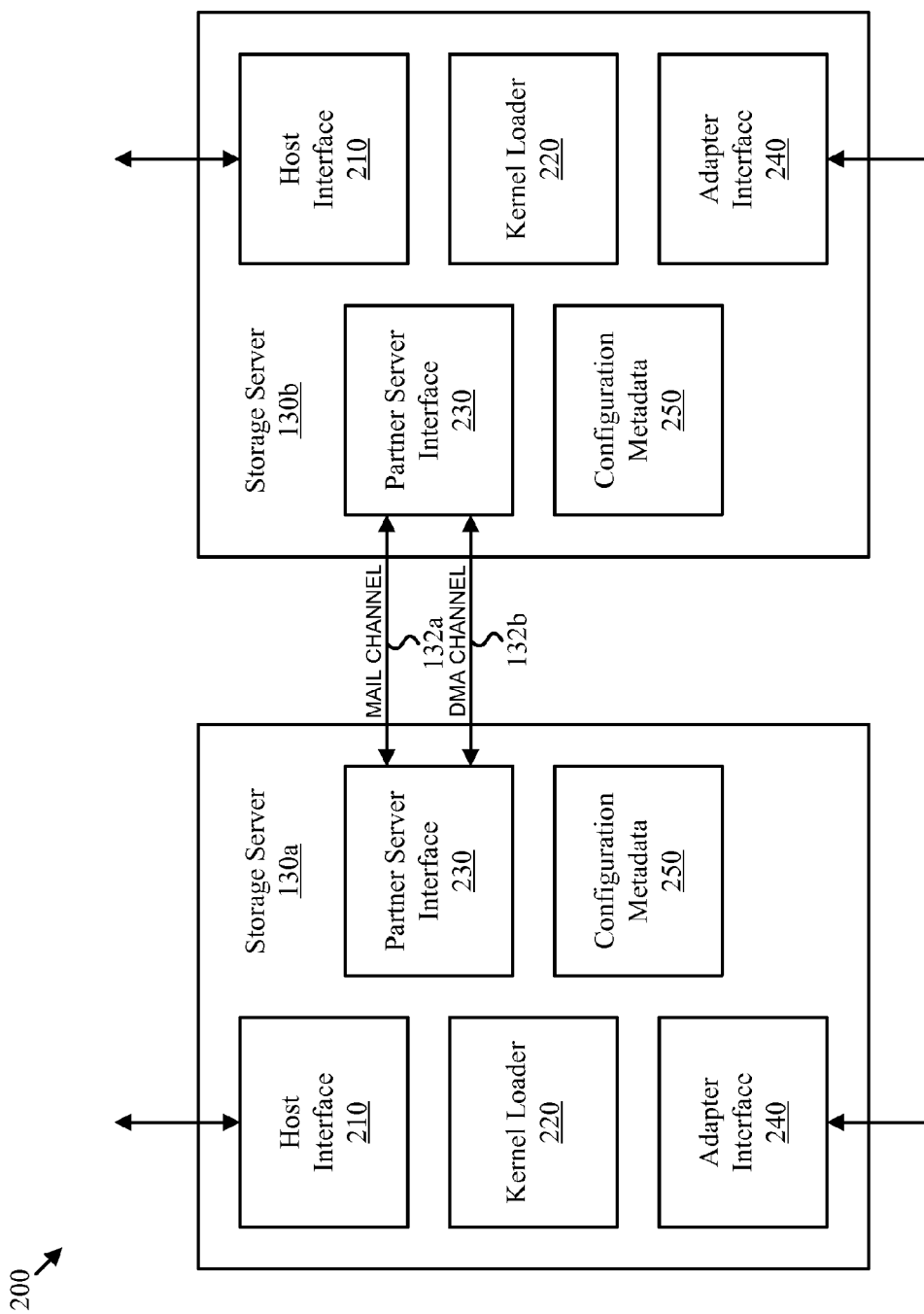
FIG. 2 is a block diagram depicting one embodiment of a set of cooperative storage servers in accordance with the present invention.

FIG. 2 is a block diagram depicting one embodiment of a set of cooperative storage servers 200 in accordance with the present invention. As depicted, the cooperative storage servers 200 include a host interface 210, a kernel loader 220, a partner server interface 230, an adapter interface 240, and configuration metadata 250. The cooperative storage servers 200 are one example of the storage servers 130a and 130b depicted in FIG. 1.

The host interface 210 facilitates receiving requests, commands, and data from a computing host (or the like) and providing data and status information to such hosts. The requests, commands, and data may include configuration options and definitions corresponding to the configuration metadata 250. The configuration metadata 250 may reside within a volatile memory and may be updated in response to requests, commands, and data received through the host interface 210. Furthermore, the configuration metadata 250 may be stored on a non-volatile storage device or array for subsequent access via the adapter interface 240.

In certain embodiments such as the depicted embodiment, the kernel loader 220 loads OS extensions into the kernel of the storage server 130 and enables the storage server to execute kernel mode routines optimized for conducting storage operations.

The partner server interface 230 facilitates communication between a storage server and a partner storage server. The relationship between the storage server and the partner storage server may be a peer-to-peer relationship, or a master-slave relationship, or any relationship beneficial to a particular application or deployment. In the depicted embodiment, the partner server interface facilitates communications between the storage servers 130a and 130b via mail channels 132a and DMA channels 132b. Similarly, the adapter interface 240 facilitates communications with a storage adapter such as the storage adapter 140 shown in FIG. 1.

The configuration metadata 250 may include a variety of definitions and control parameters such as rank definitions, volume definitions, logical subsystem definitions, mirroring parameters, remote archiving parameters, a rank segment table, and page pointer data. The configuration metadata 250 may be used or referenced by a program executed by the storage servers 200 and may need to be properly initialized previous to access by such a program (not shown). For example, the configuration data 250 may need to be initialized during a system initialization sequence.

In certain embodiments, a storage server 130 that is unable to retrieve and initialize the configuration metadata 250 via the adapter interface 240, may send a metadata request to the partner storage server 130 via the mail channel 132a. In response thereto, the partner server may communicate the configuration metadata via the DMA channel 132b. Alternately, the partner server may communicate a reference to configuration metadata that was retrieved by the partner server from the storage array. In one embodiment, the reference to the configuration metadata enables the storage server to retrieve the configuration metadata from the partner storage server via the DMA channel 132b. In one embodiment, such communication occurs during a kernel initialization sequence conducted by the kernel loader 220. The kernel initialization sequence may be part of a system initialization sequence conducted by each storage server.

The flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
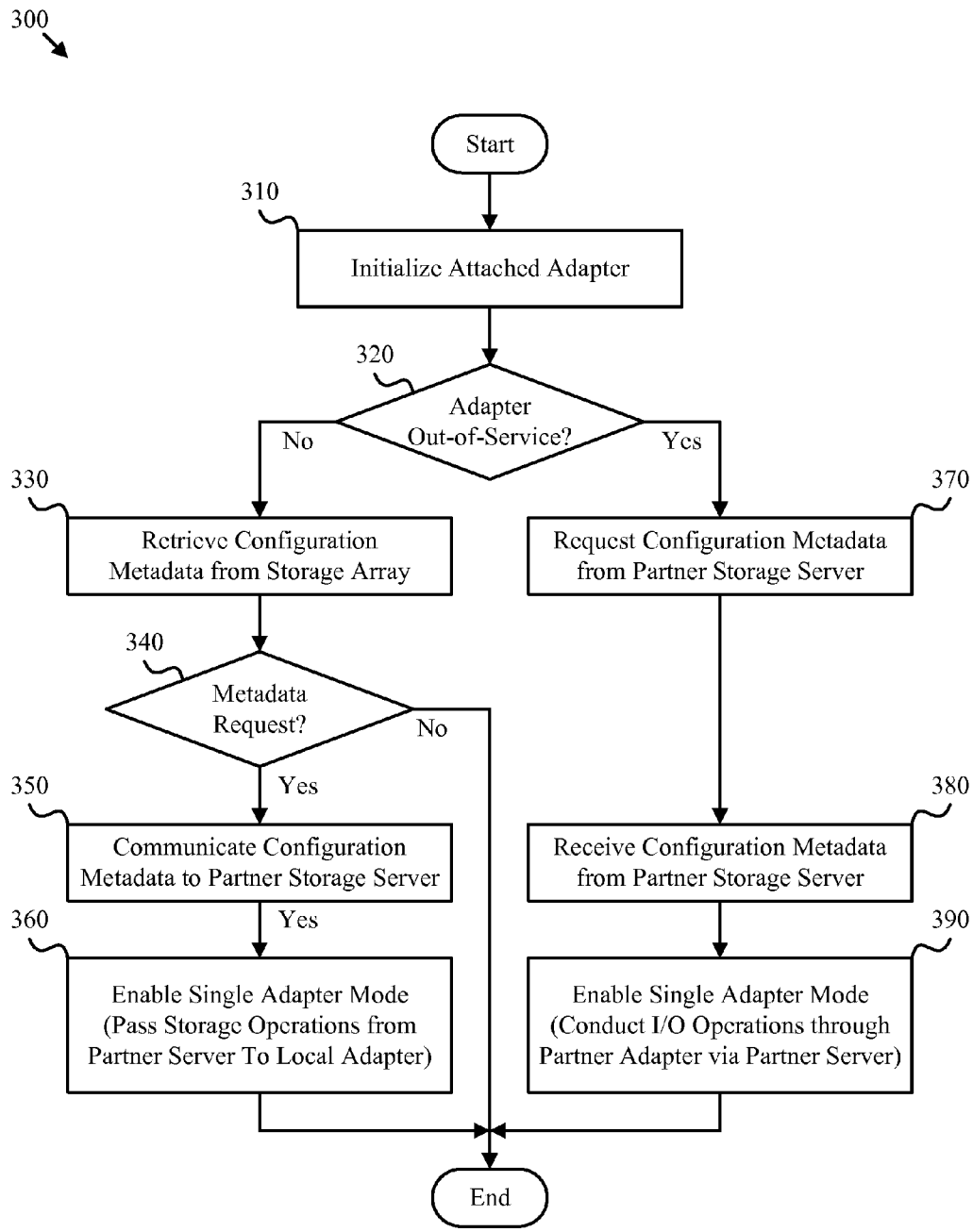
FIG. 3 is a flow chart depicting one embodiment of storage server configuration method in accordance with the present invention.

FIG. 3 is a flow chart depicting one embodiment of a storage server configuration method 300 in accordance with the present invention. As depicted, the storage server configuration method 300 includes initializing 310 an attached adapter, determining 320 if the attached adapter is out-of-service, retrieving 330 configuration metadata from a storage array, determining 340 if a metadata request has occurred, communicating 350 configuration metadata to a partner storage server, and enabling 360 a single adapter mode. The storage server configuration method 300 may also include requesting 370 configuration metadata, receiving 380 the configuration metadata, and enabling 390 a single adapter mode.

The storage server configuration method 300 is presented herein from the perspective of a program executing on a particular storage server that may be in communication with another storage server such as a partner storage server. The depicted method may be conducted during a system initialization sequence or the like. In the depicted embodiment, the method 300 assumes that the storage servers will operate in a dual adapter mode after initialization (which may include load sharing) unless an out-of-service condition is determined for one of the adapters.

Initializing 310 an attached adapter may include initializing control registers on an adapter attached to (or dedicated to) the storage server. Determining 320, if the adapter is out-of-service, may include attempting communications with the storage adapter and invoking certain diagnostic routines that assess the functional health of the adapter.

If the storage adapter is determined to be functional and available, the depicted method proceeds along the left branch (operations 330-360) of FIG. 3. If the adapter is determined to be non-functional or unavailable, the depicted method proceeds along the right branch (operations 370-390) of FIG. 3. The right branch of FIG. 3 corresponds to an available-for-service status for the storage adapter, while the left branch corresponds to an out-of-service status for the storage adapter. The out-of-service status may be due to a variety of conditions including a fenced condition, a quiesced condition, an unconfigured condition, a hardware failure, and a software failure.

The method proceeds along the left branch of FIG. 3 by retrieving 330 configuration metadata from the storage array. In one embodiment, retrieving 330 configuration metadata from a storage array includes accessing a known location on a storage device such as a particular sector or block dedicated to storing configuration metadata. The configuration metadata may include a variety of parameters and definitions such as rank definitions, volume definitions, logical subsystem definitions, mirroring parameters, remote archiving parameters, a rank segment table, and page pointer data.

Determining 340 if a metadata request has occurred may include scanning messages received from a partner storage server or the like. If a metadata request has not occurred, the depicted method terminates. In another embodiment, the method enters a wait state and waits for additional messages. If a metadata request (not shown) has occurred, the method proceeds by communicating 350 configuration metadata to the partner storage server. In one embodiment, the configuration metadata is communicated on a dedicated DMA channel that links the storage server to the partner storage server. Subsequently, the method proceeds by enabling 360 a single adapter mode.

Enabling 360 a single adapter mode may include setting one or more variables used to control program flow or executing a program that assumes a particular system configuration. In the depicted embodiment, the single adapter mode (360) enables the storage server and the storage adapter attached thereto to function as a conduit for communications between the partner storage server and the storage array 150 despite an out-of-service condition for the storage adapter attached to the partner storage server.

If the method determines 320 that the adapter attached to the storage server is out-of-service (i.e. non-functional or unavailable), the depicted method proceeds by requesting 370 configuration metadata from the partner storage server. In one embodiment, requesting 370 includes sending a mail message requesting the configuration metadata.

The method continues by receiving 380 the configuration metadata and enabling 390 a single adapter mode. In one embodiment, the configuration metadata is received on a DMA channel that links the storage server to the partner storage server. In certain embodiments, the single adapter mode enabled at 390 is essentially the same mode that is activated in at 360 with the roles of the two storage servers reversed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code executable to perform operations to configure a storage server despite an out-of-service storage adapter, the operations of the computer program product comprising:
    retrieving configuration metadata from a storage array to a first storage server via a first storage adapter during a system initialization sequence for the first storage server, wherein the configuration metadata is essential to storing data to, and retrieving data from, the storage array;
    communicating the configuration metadata from the first storage server to a second storage server in response to an out-of-service status of a second storage adapter, the second storage server connected to the storage array via the second storage adapter; and
    facilitating storage communications between the second storage server and the storage array via the first storage adapter in response to the out-of-service status for the second storage adapter.

2. The computer program product of claim 1, further comprising sharing a processing load between the first storage server and the second storage server.

3. The computer program product of claim 1, further comprising detecting the out-of-service status for the second storage adapter.

4. The computer program product of claim 1, further comprising detecting an available-for-service status for the first storage adapter.

5. The computer program product of claim 1, wherein the out-of-service status is due to a condition selected from the group consisting of a fenced condition, a quiesced condition, an unconfigured condition, a hardware failure, and a software failure.

6. The computer program product of claim 1, wherein the configuration metadata comprises metadata selected from the group consisting of rank definitions, volume definitions, logical subsystem definitions, mirroring parameters, remote archiving parameters, a rank segment table, and page pointer data.

7. A system to configure a storage server despite an out-of-service storage adapter, the system comprising:
    a storage array comprising a plurality of storage devices;
    a first storage server connected to the storage array via a first storage adapter, the first storage server configured to retrieve configuration metadata from the storage array during a system initialization sequence for the first storage server wherein the configuration metadata is essential to storing data to, and retrieving data from, the storage array;
    a second storage server connected to the storage array via a second storage adapter;
    the first and second storage servers configured to communicate the configuration metadata from the first storage server to the second storage server through a Direct Memory Access ("DMA") channel in response to an out-of-service status of the second storage adapter; and
    the first and second storage servers further configured to direct communications between the second storage server and the storage array through the first storage adapter in response to the out-of-service condition for the second storage adapter.

8. The system of claim 7, wherein the first and second storage servers are further configured to sharing a processing load in response to the out-of-service condition for the second storage adapter.

9. The system of claim 7, wherein the out-of-service status is due to a condition selected from the group consisting of a fenced condition, a quiesced condition, an unconfigured condition, a hardware failure, and a software failure.

10. The system of claim 7, wherein the configuration metadata comprises metadata selected from the group consisting of rank definitions, volume definitions, logical subsystem definitions, mirroring parameters, remote archiving parameters, a rank segment table, and page pointer data.

11. A storage server comprising:
    a host interface configured to enable communications with a host;
    a storage adapter interface configured to enable communications with a storage array;
    a kernel loader configured to retrieve configuration metadata from the storage array via the storage adapter interface during a system initialization sequence;
    a partner server interface configured to communicate the configuration metadata to a partner storage server in response to a request for the configuration metadata; and
    the partner server interface further configured to facilitate storage communications between the second storage server and the storage array via the first storage adapter in response to an out-of-service status of the second storage adapter,
    wherein the configuration metadata is essential to storing data to, and retrieving data from, the storage array.

12. The storage server of claim 11, wherein the partner server interface is further configured to sharing a processing load with the partner storage server in response to an out-of-service condition for the second storage adapter.

13. The storage server of claim 11, wherein an out-of-service status is due to a condition selected from the group consisting of a fenced condition, a quiesced condition, an unconfigured condition, a hardware failure, and a software failure.

14. The storage server of claim 11, wherein the configuration metadata comprises metadata selected from the group consisting of rank definitions, volume definitions, logical subsystem definitions, mirroring parameters, remote archiving parameters, a rank segment table, and page pointer data.

15. A method to configure a storage server despite an out-of-service storage adapter, the method comprising:

provolding a first storage server connected to a storage array via a first storage adapter;

providing a second storage server connected to the storage array via the second storage adapter;

retrieving configuration metadata from the storage array to the first storage server during a system initialization sequence for the first storage server, wherein the configuration metadata is essential to storing data to, and retrieving data from, the storage array;

communicating the configuration metadata from the first storage server to the second storage server in response to an out-of-service status of the second storage adapter; and conducting storage communications between the second storage server and the storage array via the first storage adapter in response to the out-of-service status for the second storage adapter.

16. The method of claim 15, further comprising sharing a processing load between the first storage server and the second storage server.

17. The method of claim 15, further comprising detecting the out-of-service status for the second storage adapter.

18. The method of claim 15, further comprising detecting an available-for-service status for the first storage adapter.

19. The method of claim 15, wherein the out-of-service status is due to a condition selected from the group consisting of a fenced condition, a quiesced condition, an unconfigured condition, a hardware failure, and a software failure.

20. The method of claim 15, wherein the configuration metadata comprises metadata selected from the group consisting of rank definitions, volume definitions, logical subsystem definitions, mirroring parameters, remote archiving parameters, a rank segment table, and page pointer data.

* * * * *